US007646936B2

(12) United States Patent
Nord et al.

(10) Patent No.: US 7,646,936 B2
(45) Date of Patent: Jan. 12, 2010

(54) SPATIALLY VARIANT IMAGE DEFORMATION

(75) Inventors: Janne Nord, Espoo (FI); Hannu Helminen, Zürich (CH)

(73) Assignee: Varian Medical Systems International AG, Zug (CH)

( * ) Notice: Subject to any disclaimer, the term of this patent is extended or adjusted under 35 U.S.C. 154(b) by 667 days.

(21) Appl. No.: 11/542,952

(22) Filed: Oct. 3, 2006

(65) Prior Publication Data

US 2008/0080788 A1    Apr. 3, 2008

(51) Int. Cl.
*G06K 9/32* (2006.01)
(52) U.S. Cl. .................. 382/294; 382/128; 382/174; 382/175
(58) Field of Classification Search .................. 382/128, 382/130, 131, 274, 275, 294
See application file for complete search history.

(56) References Cited

U.S. PATENT DOCUMENTS

| | | | |
|---|---|---|---|
| 6,537,268 B1 * | 3/2003 | Gibson et al. | 604/891.1 |
| 6,768,811 B2 * | 7/2004 | Dinstein et al. | 382/128 |
| 6,819,790 B2 * | 11/2004 | Suzuki et al. | 382/156 |
| 7,006,881 B1 * | 2/2006 | Hoffberg et al. | 700/83 |
| 7,239,908 B1 * | 7/2007 | Alexander et al. | 600/427 |

OTHER PUBLICATIONS

Stefanescu, R. et al., "Grid powered nonlinear image registration with locally adaptive regularization", Medical Image Analysis, Oxford University Press, GB, vol. 8 (2004), pp. 325-342.

Shen, Jian-Kun et al., "Deformable Image Registration", Image Processing, ICIP 2005, IEEE International Conference, Sep. 11-14, 2005, IEEE, vol. 3, pp. 1112-1115, ISBN 978-0-7803-9134-9/05.

Lester, H. et al, "Non-linear registration with the variable viscosity fluid algorithm", Proceedings of the 16th International Conference on Information Processing in Medical Imaging, Lecture Notes in Computer Science, Springer-Verlag, UK, vol. 1613, pp. 238-251, 1999, ISBN:3-540-66167-0.

Wang, H. et al, "Validation of an accelerated 'demons' algorithm for deformable image registration in radiation therapy" Physics in Medicine and Biology, Taylor & Francis LTD. London, GB, vol. 50, No. 12, Jun. 2005, pp. 2887-2905.

Thirion, Jean-Philippe, "Non-Rigid Matching Using Demons", Proceedings of the 1996 Conference on Computer Vision and Pattern Recognition (CVPR '96), San Francisco, Jun. 18-20, 1996, IEEE Computer Society Washington, DC, USA, pp. 245-251, ISBN:0-8186-7258-3.

* cited by examiner

*Primary Examiner*—Yosef Kassa
(74) *Attorney, Agent, or Firm*—Gard & Kaslow LLP

(57) ABSTRACT

Disclosed are systems for and methods of registering (i.e., aligning) a deformable image with a reference image subject to a spatially variant flexibility model and/or a non-Gaussian smoothing model. These systems and methods allow for the consideration of differences between the ways in which structures of interest may move within a patient. The registration includes modifying the deformable image to match similar features in the reference image. The systems include a deformation engine configured for performing a deformation algorithm subject to the spatially variant flexibility and/or smoothing models.

27 Claims, 5 Drawing Sheets

Internal Force Computation Engine 220

Flexibility Value Computation Engine 410

Accumulator Computation Engine 420

FIG. 4

SPATIALLY VARIANT IMAGE DEFORMATION

CROSS-REFERENCE TO RELATED APPLICATIONS

The present application is related to U.S. application Ser. No. 11/542,958 entitled "Use of Quality of Match to Estimate Cone Beam CT Reconstruction Artifact Correction Weight in Image Registration" filed on even date herewith. The disclosure of the above patent application is hereby incorporated herein by reference.

BACKGROUND

1. Field of the Invention

The present invention relates generally to the field of image registration and more specifically to the field of image registration configured for medical applications.

2. Related Art

Deformable image registration is a technique for modifying a deformable image in an elastic way to match similar features in a reference image. The technique, in general, involves determining a transform necessary to register (e.g., to align) two images by matching structures of interest in the deformable image and the reference image and to deform the deformable image to achieve alignment of these structures. The deformable and reference images may be images of a patient at different times. The deformable image may be an image of a healthy person and the reference image may be an image of a patient, or vice versa.

For example, the deformable image may include an image of a patient in which a physician has carefully delineated a treatment volume, and the reference image may include an image of the same patient recorded at a later time during treatment. A treatment volume is a spatial volume within a patient to be treated using radiation such as X-rays or particle beams. By deforming the carefully delineated image to align with an image recorded during treatment, movement in the treatment volume can be readily identified. The unaltered reference image, having a treatment volume identified through the image registration process, can then be used to target the new position of the treatment volume during treatment.

The technique has various medical applications. One medical application includes identification of movement or change in organs in medical images acquired at different points in time, for example, changes in patient anatomy since an image was taken at the outset of a treatment plan, for example, for planning purposes. Changes in organs can occur due to the spread of cancer, bladder fullness, swelling, breathing, etc.

Another medical application of the deformable image registration technique is segmentation of images using a pre-segmented atlas against which the images are registered. After registration is complete, an identity and/or scope of an anatomical structure within the reference image can be established automatically using previous identification of a corresponding structure within the deformable image. Both medical applications allow for the identification of, for example, changes in an organ during the course of treatment such that the treatment may be altered or discontinued.

Modification of the deformable image includes use of a deformation algorithm that includes a flexibility model of displacement vectors. Various deformation algorithms exist in the prior art, for example, a demons algorithm. The flexibility model in the demons algorithm comprises Gaussian smoothing of the field of displacement vectors. A "similarity" force is exerted on the displacement vectors by using a normalized optical flow. One advantage of the demons algorithm is the speed at which the steps of the algorithm are performed (e.g., on the order of minutes).

A disadvantage of existing deformation algorithms is that their flexibility model is constant across the field of displacement vectors. Certain structures in medical images require more flexibility than others. For example, during a breathing cycle, a lung slides against a membrane at an edge of the lung. Although the lung stretches in a smooth manner, the movement is difficult to account for using current models.

There is, therefore, a need for improved systems and methods of registering medical images.

SUMMARY

Various embodiments include systems for and methods of registering (i.e., aligning) a deformable image with a reference image subject to a set of spatially variant operations. For example, in the context of medical applications, the deformable image may include an image of a healthy organ and the reference image may include an image of a patient, or vice versa. In these embodiments, the image of a healthy organ is typically used as a template to match similar features in the image of the patient. Alternatively, the deformable image may include an image of a patient previously recorded and the reference image may include an image more recently recorded, or vice versa.

Image deformation is accomplished using a deformation algorithm that includes one or more spatially dependent features. For example, the deformation algorithm may include a flexibility model and/or a smoothing model that are subject to a set of spatially variant constraints or scalars. In some embodiments, these spatial features allow for improved image registration, relative to the prior art, because the spatial dependencies more realistically account for variations in the positions of features of interest within a human body. For example, the relative movement of a muscle and a bone can be expected to be spatially dependent in that much of the motion occurs along the direction of contraction of the muscle. By accounting for this dependence in image deformation, a faster and/or more accurate result may be achieved, relative to the prior art.

Spatial dependence may be included in calculation of displacement vectors, computing of flexibility values, and/or smoothing functions. For example, in some embodiments, the deformation algorithm includes a flexibility model comprising a set of spatially variant constraints and/or scalars. In various embodiments, the spatially variant flexibility model is dependent on location as well as direction of internal and external forces exerted on individual pixels.

In various embodiments, the deformation algorithm includes a smoothing model configured to apply a Gaussian smoothing function having some similarities to the Gaussian smoothing functions used in the demons algorithm of the prior art. In other embodiments, the smoothing model is configured to apply a spatially variant smoothing function, such as a spatially variant exponential smoothing function. Some embodiments include a spatially variant smoothing function and a flexibility model that does not vary as a function of position or direction, i.e., is not spatially variant.

Various embodiments further include a repository for storing images and/or other data associated with the deformation engine, a computing system for storing part or all of the data associated with the deformation algorithm, and an image generation apparatus for printing or displaying, for example, a deformed image.

Various embodiments of the invention include an image registration system comprising a deformation engine comprising first logic configured to compute a flexibility model comprising a first set of spatially variant constraints or spatially variant scalars and to apply the computed flexibility model to a medical deformable image to generate a set of displacement vectors, the set of displacement vectors being configured to apply a first force to the medical deformable image, second logic configured to compute a non-Gaussian smoothing function and to apply the computed non-Gaussian smoothing function to the set of displacement vectors to create a smoothed set of displacement vectors, third logic configured to compute a transform, the transform being configured to apply a second force to the medical deformable image, the second force opposing the first force, and fourth logic configured to apply the smoothed set of displacement vectors and the transform to the medical deformable image to deform the medical deformable image to match a reference image.

Various embodiments of the invention include an image registration system comprising a deformation engine comprising first logic configured to compute a flexibility model comprising a set of spatially variant constraints or spatially variant scalars and to apply the computed flexibility model to a medical deformable image to generate a set of displacement vectors, the set of displacement vectors being configured to apply a first force to the medical deformable image, second logic configured to compute a Gaussian smoothing function and to apply the computed Gaussian smoothing function to the set of displacement vectors to create a smoothed set of displacement vectors, third logic configured to compute a transform, the transform being configured to apply a second force to the medical deformable image, the second force opposing the first force, and fourth logic configured to apply the smoothed set of displacement vectors and the transform to the medical deformable image to deform the medical deformable image to match a reference image.

Various embodiments of the invention include an image registration system comprising a deformation engine comprising first logic configured to compute a flexibility model and to apply the computed flexibility model to a medical deformable image to generate a set of displacement vectors, the set of displacement vectors being configured to apply a first force to the medical deformable image, second logic configured to compute a spatially variant smoothing function and to apply the computed spatially variant smoothing function to the set of displacement vectors to create a smoothed set of displacement vectors, third logic configured to compute a transform, the transform being configured to apply a second force to the medical deformable image, the second force opposing the first force, and fourth logic configured to apply the set of displacement vectors and the transform to the medical deformable image to deforming the medical deformable image to match a reference image.

Various embodiments of the invention include a method comprising computing a set of displacement vectors according to a flexibility model comprising a first set of spatially variant constraints or spatially variant scalars, the set of displacement vectors being configured to apply a first force to a medical deformable image, applying a non-Gaussian smoothing function to the set of displacement vectors to create a smoothed set of displacement vectors, computing a transform configured to apply a second force to the medical deformable image, the second force opposing the first force, and applying the transform and the smoothed set of displacement vectors to the medical deformable image to match the medical deformable image to a reference image.

Various embodiments of the invention include a method comprising computing a set of displacement vectors according to a flexibility model comprising a set of spatially variant constraints or spatially variant scalars, the set of displacement vectors being configured to apply a first force to a medical deformable image, applying a Gaussian smoothing function to the set of displacement vectors to create a smoothed set of displacement vectors, computing a transform configured to apply a second force to the medical deformable image, the second force opposing the first force, and applying the computed transform and the smoothed set of displacement vectors to the medical deformable image to match the medical deformable image to a reference image.

Various embodiments of the invention include a method comprising computing a set of displacement vectors according to a flexibility model and applying the set of displacement vectors to a medical deformable image, the set of displacement vectors being configured to apply a first force to the medical deformable image, applying a spatially variant smoothing function to the medical deformable image, computing a transform configured to apply a second force to the medical deformable image, the second force opposing the first force, and applying the transform to the medical deformable image to match the medical deformable image to a reference image.

BRIEF DESCRIPTION OF THE DRAWINGS

FIG. 4 illustrates various embodiments of an internal force computation engine.

DETAILED DESCRIPTION

Figure 1:
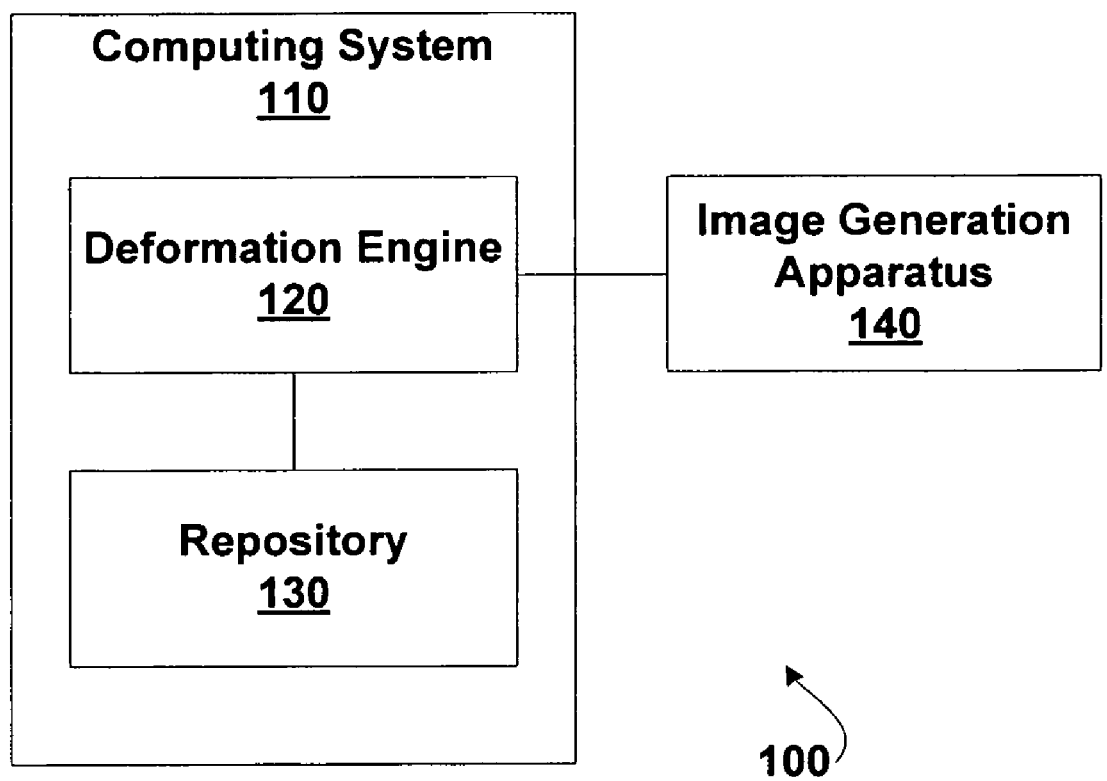
FIG. 1 illustrates various embodiments of an image registration system.

Various embodiments of the invention include systems for and methods of registering (i.e., aligning) a deformable image with a reference image subject to a set of spatially variant constraints and/or spatially variant scalars. The registration is accomplished using a registration system and includes modifying the deformable image (e.g., an image of a healthy individual used as a template) to match similar features in the reference image (e.g., of a patient). The registration system includes a deformation engine configured for performing a deformation algorithm subject to the set of spatially variant constraints. The deformation algorithm includes a flexibility model configured to calculate displacement vectors between the reference image and the deformable image as well as a smoothing model. As is further described herein, deformation of an image using the deformation algorithm may be performed in multiple iterations. A deformable image may be referred to as a medical deformable image herein when the deformable image is used for medical and/or anatomical purposes.

Various embodiments include extensions to the demons algorithm of the prior art. The demons algorithm comprises two phases of deforming an image. In a first phase, the deformable image is deformed in a path of least resistance under the influence of an external force. This force is considered external because the movement of each pixel is determined by considering intensities of pixels in the reference image so as to minimize the differences in intensities between the deformable image and the reference image. In a second phase, the demons algorithm reconnects the pixels using the Gaussian smoothing model applied to the deformable image. This internal force tends to keep the pixels together to prevent the entire deformable image from dissolving. The internal force tends to apply a force to the pixels opposing the external force of the first phase. In order to deform the deformable image to match the reference image, these two phases of the demons algorithm are typically repeated in an iterative process. In typical embodiments, the set of spatially variant constraints, accumulators, and/or smoothing function of the present invention are applied in the second phase of the demons algorithm.

The deformation engine includes an external force computation engine, an internal force computation engine, an external constraint computation engine, and a matching engine. The internal force computation engine includes logic configured to compute the displacement vectors used in the flexibility model. The flexibility model may include varying degrees of complexity from a set of constant flexibility values to a bi-directional multi-dimensional flexibility model dependent on location as well as direction of internal and external forces exerted on individual pixels. In some embodiments, the internal force computation engine includes logic configured to compute and apply a smoothing model. The smoothing model can be the Gaussian model used in the demons algorithm or another smoothing model, for example, an exponential smoothing model.

The image registration system optionally further includes a repository configured for storing data associated with the deformation algorithm (e.g., data used as inputs and/or generated as interim and/or final results). For example, in some embodiments, sets of flexibility values, a priori properties of organs and/or patients, the reference and deformable images, or the like, are stored in the repository. Alternative embodiments include a computing system, external to the deformation engine, configured for storing part or all of the data associated with the deformation algorithm.

In some embodiments, the image registration system optionally further includes an image generation apparatus for producing the deformable image. The image generation apparatus may include, for example, an X-ray source and corresponding detector, a computed tomography system, a magnetic resonance system, an ultrasound system, and/or the like.

FIG. 1 illustrates an Image Registration System, generally designated 100, according to various embodiments of the invention. Image Registration System 100 is configured to deform a deformable image into alignment with a reference image using the deformation algorithm subject to the set of spatially variant constraints. Image Registration System 100 is optionally further configured to perform computations responsive to the deformed deformable image. For example, some embodiments of Image Registration System 100 include logic configured to compute a volume and/or location of an anatomical structure in the deformable image, such as the volume of gray brain matter. In various embodiments, the logic comprises a processor, other computer readable medium and/or other hardware on which firmware and/or software is embodied.

Image Registration System 100 typically includes a Computing System 110. Computing System 110 may comprise, for example, a personal computer, workstation, server, computing devices distributed over a network, and/or the like. Computing System 110 comprises logic configured for performing computations and/or data processing associated with the deformation algorithm. This logic includes a Deformation Engine 120 discussed further elsewhere herein. In some embodiments, Computing System 110 further comprises a Repository 130 configured to store computing instructions, a reference image, a deformable image, and/or data (e.g., values and/or parameters) associated therewith. Repository 130 may include random access memory, non-volatile memory, volatile memory, magnetic storage, optical storage, and/or the like. For example, in some embodiments, Computing System 110 comprises a hard drive configured to store data associated with the patient, the reference image, the anatomical structure (e.g., organ) of interest, the deformable image (e.g., a segmented brain atlas), initial values associated with the deformation algorithm, and/or the like.

Deformation Engine 120 is configured for deforming the deformable image according to a deformation algorithm. Deformation Engine 120 comprises logic configured for performing computations and/or data processing associated with the deforming of the deformable image. This logic may include hardware, firmware and/or computing instructions disposed on a computer readable medium. In some embodiments, Deformation Engine 120 includes a microprocessor and associated memory. As is discussed further herein, the deformation algorithm may comprise the demons algorithm, an exponential smoothing algorithm, or the like.

In some embodiments, part of Deformation Engine 120 is disposed external to Computing System 110. Likewise, in some embodiments, part of Repository 130 is disposed external to Computing System 110.

Image Registration System 100 further optionally includes an Image Generation Apparatus 140 configured for generating the reference image and/or the deformable image. For example, Image Generation Apparatus 140 may include a radiation (e.g., X-ray) source and associated detector configured to detect X-rays passed through a patient. In various embodiments, Image Generation Apparatus 140 includes a magnetic resonance imaging device, a computed tomography device, an ultrasound device, an X-ray device, and/or other device known in the art to generate internal images of a patient. Image Generation Apparatus 140 may be configured to generate two-dimensional, three-dimensional, or four-dimensional images. In some embodiments, Image Generation Apparatus 140 may be configured to generate a series of images, for example, a three-dimensional time series of breathing motion. This series is considered a four-dimensional image. Image Generation Apparatus 140 is optionally configured to communicate image data to Computing System 110 through a direct connection (e.g., a cable), over a computing network, or through an alternative communication network.

In various embodiments, Image Generation Apparatus 140 is coupled to Deformation Engine 120. In some embodiments, Image Generation Apparatus 140 is coupled to Computing System 110. In yet other embodiments, part or all of Image Generation Apparatus 140 is included in Computing System 110.

Figure 2:
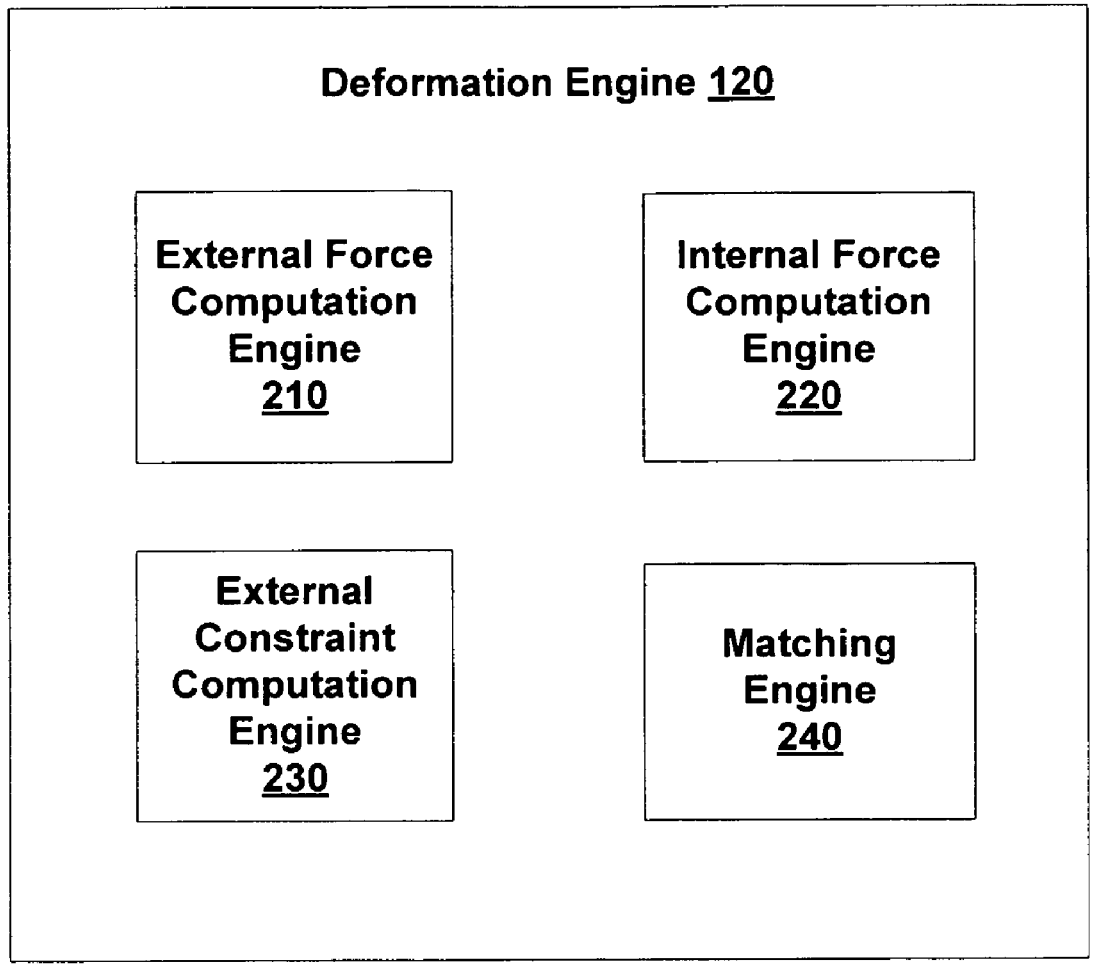
FIG. 2 illustrates various embodiments of a deformation engine.

FIG. 2 illustrates various embodiments of Deformation Engine 120. Deformation Engine 120 comprises External Force Computation Engine 210, Internal Force Computation Engine 220, External Constraint Computation Engine 230, and Matching Engine 240. Each of these elements may be embodied in hardware, firmware or computing instructions within Computing System 110.

External Force Computation Engine 210 is configured for computing an external transform to be applied to the pixels of the deformable image. This computation is responsive to the deformable and reference images. External Force Computation Engine 210 comprises logic configured for performing computations and/or data processing associated with the computation of the external transform. For example, in some embodiments, External Force Computation Engine 210 includes computing instructions embodied on a computer readable medium and configured to be executed using a processor of Computing System 110.

The external transform computed using the External Force Computation Engine 210 is configured to apply an external "force" between regions, sets of pixels, and/or individual pixels of the deformable image. This force tends to cause spatial compression and/or stretching between neighboring pixels. This force is opposing to the internal force applied by the displacement vectors determined using the Internal Force Computation Engine 220. In various embodiments, the external transform comprises a set of scalars, for example, a multiplier, representative of the external force. In various embodiments, the external transform comprises a set of multi-dimensional vectors, each representing an external force on a pixel, set of pixels, or region to be applied to the deformable image. In various embodiments, the external transform is based, in part, on the demons algorithm by Thirion and/or an extension to the demons algorithm, such as but not limited to the extensions described in U.S. application Ser. No. 11/542,958 entitled "Use of Quality of Match to Estimate Cone Beam CT Reconstruction Artifact Correction Weight in Image Registration" (PA3718US). See "Image matching as a diffusion process: an analogy with Maxwell's demons," by J.-P. Thirion, *Medical Image Analysis*, vol. 2, no. 3, pp. 243-260, 1998.

Internal Force Computation Engine 220 is configured for computing the internal force that tends to reduce excessive spatial compression and/or stretching between neighboring pixels of the deformable image. Such excessive compression and/or stretching right otherwise cause a region of the deformable image to dissolve. Internal Force Computation Engine 220 is configured for computing one or more displacement vectors, one or more accumulators, and/or a smoothing function. Internal Force Computation Engine 220 comprises logic configured for performing computations and/or data processing associated with computing a displacement vector, an accumulator, and/or a smoothing function. For example, in one embodiment, Internal Force Computation Engine 220 includes a processor and associated computing instructions configured to determine a displacement vector associated with each pixel of a deformable image. The displacement vector is representative of a displacement of a pixel relative to an original position of the pixel. The displacement of one or more pixels results in deformation of the deformable image.

Internal Force Computation Engine 220 is further configured to determine displacement vectors responsive to a flexibility model, and the deformable and reference images. This flexibility model is used to determine the flexibility of the displacement of pixels, sets of pixels, and/or regions of an image. For example, a pixel associated with a larger flexibility value may be associated with a displacement vector of greater magnitude relative to a pixel associated with a smaller flexibility value. In various embodiments, the flexibility model is based, in part, on the demons algorithm by Thirion, and/or an extension thereto. The flexibility model is described in further detail elsewhere herein, e.g., in connection with FIG. 5.

Internal Force Computation Engine 220 is further configured for smoothing (e.g., filtering) the deformable image by applying a smoothing model that uses the computed displacement vectors. In various embodiments, Internal Force Computation Engine 220 is configured to use different smoothing models. For example, in some embodiments, Internal Force Computation Engine 220 is configured to use a smoothing model based on a Gaussian function. This Gaussian function is optionally similar to that used in the demons algorithm and/or an extension thereto. This Gaussian function is optionally variable during deformation of an image. For example, the standard deviation of the Gaussian function may be constant or may be changed between successive iterations of the deformation algorithm.

In some embodiments, Internal Force Computation Engine 220 is configured to use a smoothing model based on an exponential function. The exponential function is optionally spatially variant, i.e., it can vary as a function of position and/or direction. In some embodiments, this spatial variance may be used to account for differences in the relative movements of organs or other structures of interest between images. Other embodiments include smoothing models, such as polynomial, binomial, quadratic, box smoothing, and cosine. Yet other embodiments include smoothing models that are user defined, for example, a hand-drawn (e.g., interpolated from control points) kernel function scaled in a spatial direction and/or multiplied by a factor that is flexibility dependent. Smoothing models that may be used by Internal Force Computation Engine 220 are described in further detail elsewhere herein, e.g., in connection with FIG. 5.

External Constraint Computation Engine 230 is configured for computing external constraints to be imposed on the deformation algorithm. External Constraint Computation Engine 230 comprises logic configured for performing computations and/or data processing associated with computing an external constraint. For example, in one embodiment, External Constraint Computation Engine 230 includes a processor and associated computing instructions configured to determine a user-defined external constraint imposed on the deformation algorithm, such as a known location of an organ and/or of a specific point of an anatomical structure. In some embodiments, External Constraint Computation Engine 230 is configured to automatically detect external constraints.

In some embodiments, external constraints are averaged to the field of displacement vectors using a pre-defined weight matrix. In various embodiments, external constraints are stored in Computing System 110, for example, in Repository 130. In some embodiments, part or all of external constraints are input into External Constraint Computation Engine 230, for example, manually by a user of Image Registration System 100 or input automatically from a source disposed external to Image Registration System 100.

Matching Engine 240 is configured for matching similar features in the reference image and the deformable image. Matching Engine 240 comprises logic configured for performing computations and/or data processing associated with the matching of similar features. For example, in some embodiments, Matching Engine 240 includes computing instructions embodied on a computer readable medium and configured to be executed using a processor of Computing System 110. In various embodiments, the matching comprises applying the external force and/or the internal force to the deformable image. In some embodiments, Matching Engine 240 is configured for applying the external force prior to the internal force. In other embodiments, Matching Engine 240 is configured for applying the internal force prior to the external force.

The external force calculated using the External Force Computation Engine 210 and the internal force calculated using the Internal Force Computation Engine 220 have opposing effects on the deformation of an image. For example, while the external force tends to promote the movement of pixels so as to minimize the differences between the reference image and the deformable image, the internal force tends to limit the magnitude of displacement vectors to avoid a disproportionate deformation that might otherwise cause the deformable image to dissolve. In some embodiments, Deformation Engine 120 is configured to deform an image until an equilibrium is found between the internal force and the external force, on a basis of individual pixels, sets of pixels, region of an image, or all of an image. At equilibrium, the internal force and the external force are equal and the deformation of the deformable image is complete. In some embodiments, Deformation Engine 120 is configured to deform an image through iterative application of the internal and external forces such that an equilibrium is approached. This process may conclude when a specific number of iterations has occurred, when the equilibrium is reached, and/or when further iterations result in inconsequential deformation. Equilibrium is described in further detail elsewhere herein, e.g., in connection with FIG. 5.

Figure 3:
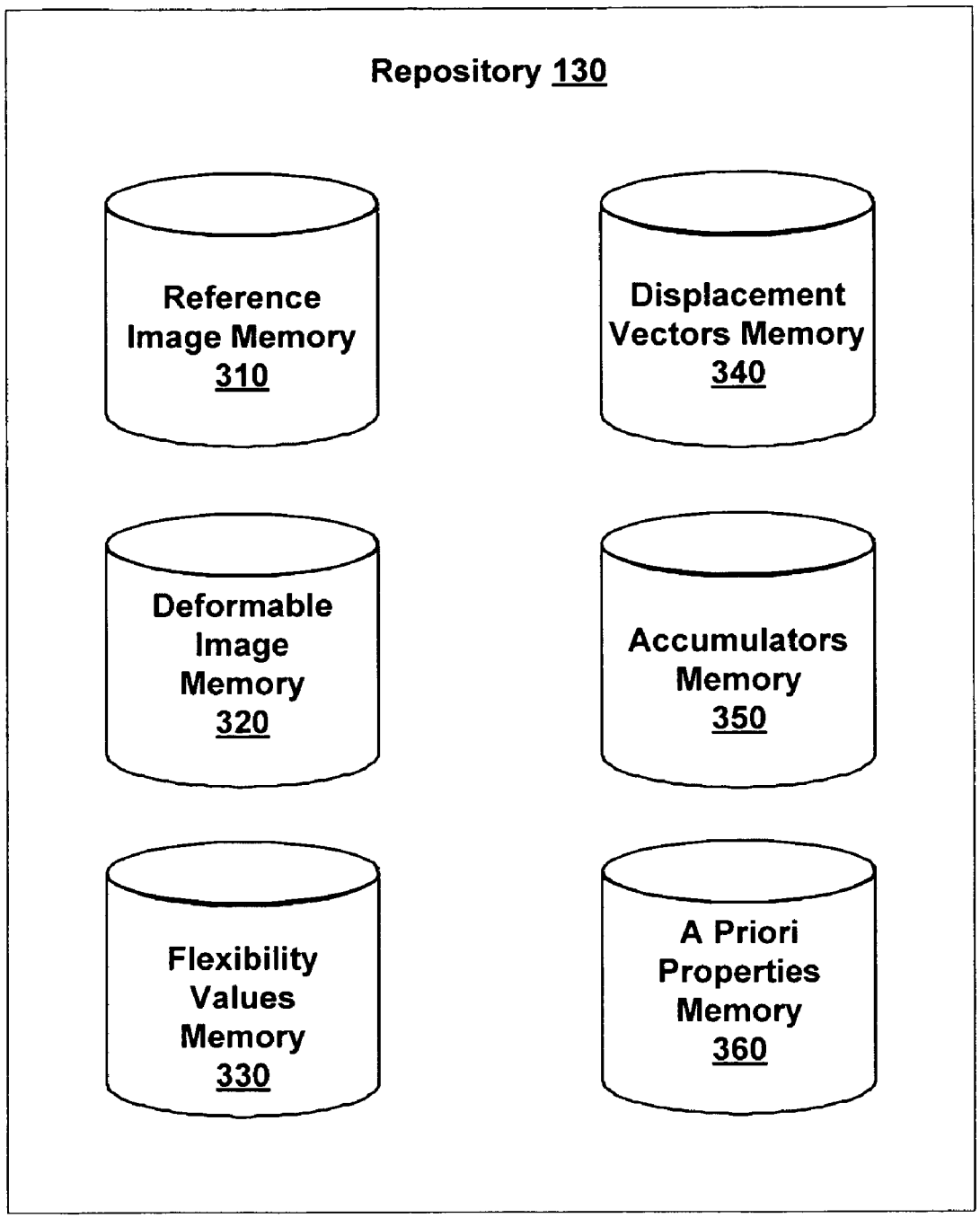
FIG. 3 illustrates various embodiment of a repository.

FIG. 3 illustrates various embodiments of Repository 130. Repository 130 includes data storage configured for storing data related to Image Registration System 100. Repository 130 may include static memory, volatile memory, magnetic memory, optical memory, and/or the like. For example, in one embodiment Repository 130 includes dynamic read only memory and a hard disk. Repository 130 comprises a Reference Image Memory 310, Deformable Image Memory 320, Flexibility Values Memory 330, Displacement Vectors Memory 340, Accumulators Memory 350, and/or A Priori Properties Memory 360. These memories are configured for storing a reference image, a deformable image, a set of flexibility values, displacement vectors, accumulators, and a priori properties, respectively. In various embodiments, two or more of these memories share the same computer readable medium. For example, in various embodiments, Reference Image Memory 310 and Deformable Image Memory 320 comprise a single memory.

Reference Image Memory 310 comprises a computer readable medium configured to store at least one reference image of a patient. For example, Reference Image Memory 310 may be configured to store a set of images of a brain of a single patient over the course of treatment. Deformable Image Memory 320 comprises a computer readable medium configured to store a deformable image, for example, a computerized brain atlas of a healthy individual, or a previously recorded image of a patient. A reference image stored in Reference Image Memory 310 is optionally generated using Image Generation Apparatus 140.

In some embodiments, the deformable image is configured to be deformed on a pixel-by-pixel basis to match the reference image such that structures of interest can be identified in the reference image. For example, within the deformable image, one or more pixels may be pre-associated with specific structures of interest. In the image registration process, these pre-associated pixels are matched to pixels in the reference image. It can then be assumed that these matched pixels in the reference image are associated with the same structures of interest as the pre-associated pixels. Structures of interest within the reference image are thereby identified. This identification can be automatic when performed under computer control, e.g., performed autonomously by a computing device without human intervention. In some embodiments, the identification of matching structures of interest is used to monitor a change in size, position, or other characteristic of a structure of interest in the same patient over time.

Deformable Image Memory 320 comprises a computer readable medium configured to store at least one deformable image. This deformable image is optionally generated using Image Generation Apparatus 140. The deformable image may include an image of a patient, an image of a healthy person, or a synthetic anatomical image. In some embodiments, Reference Image Memory 310 and Deformable Image Memory 320 share the same device within Computing System 110. For example, Reference Image Memory 310 and Deformable Image Memory 320 may be included on the same hard drive.

Flexibility Values Memory 330 comprises a computer readable medium configured for storing sets of flexibility values calculated using Internal Force Computation Engine 220 and associated with a set of spatially variant constraints. In some embodiments, Flexibility Values Memory 330 is configured to store a flexibility value and/or limit for each pixel of a deformable image. These flexibility values are further described elsewhere herein, e.g., in connection with FIGS. 2 and 4.

Displacement Vectors Memory 340 comprises a computer readable medium configured for storing the displacement vectors computed by Internal Force Computation Engine 220. Displacement Vectors Memory 340 is typically configured to store one displacement vector for each pixel in the deformable image.

Accumulators Memory 350 comprises a computer readable medium configured for storing sets of accumulators computed by Internal Force Computation Engine 220. An accumulator is a pixel-by-pixel accumulation factor associated with the smoothing model. The set of accumulators is used to modify the rate of decay of the smoothing model. For example, in embodiments comprising the exponential smoothing model, Accumulators Memory 350 is configured to store the set of accumulators for each pixel affecting the rate of decay. In some embodiments, the computation of accumulators by Internal Force Computation Engine 220 is spatially variant. The role of accumulators is further described elsewhere herein, e.g., in connection with FIGS. 4 and 5.

The term "spatially variant" as used herein may apply to the displacement vectors of the flexibility model as well as to the smoothing function. The term "set of constraints" means constraints on the flexibility model as well as on the smoothing function, collectively, unless otherwise indicated. The parameter, vector, factor, accumulator, value, and/or the like, and/or an operation of the parameter, vector, factor, accumulator, value, and/or the like, is spatially variant if it can vary as a function of the position of a region of an image. The region of the image may include a pixel or a set of pixels. In some embodiments, a region is specified by a physician or other operator using a graphical user interface. For example, a physician may specify a region by drawing an outline of a cortical surface on the image. In some embodiments, the drawing is made by hand, e.g., by a physician. In other embodiments, part or all of the drawing is made in an automatic fashion, for example, by an apparatus comprising computer code configured to outline the region. In addition, a parameter, vector, factor, accumulator, value, and/or the like, and/or its operation, is spatially variant if it can vary depending on a direction of a force (i.e., the internal and/or external force) to be exerted on the region of the image. Thus, the term "spatially variant constraint" includes the possibility that the parameter, vector, factor, accumulator, value, and/or the like and/or its operation may vary with respect to the position of the region and/or direction of the internal and/or external force on the region of the image. Examples of mathematical expressions for various spatially variant constraints are described elsewhere herein, e.g., in connection with FIG. 5.

The term "associated with" as used herein may apply to a parameter, vector, factor, accumulator, value, and/or the like and/or its operation. In this context, the parameter, etc., is associated with the pixel, set of pixels, or other region of the image if the parameter, etc., is configured to represent a property, value, displacement and/or characteristic of the pixel, set of pixels, or other region of the image.

A Priori Properties Memory 360 comprises a computer readable medium configured for storing a priori data for use in deformation of an image. A priori data can include data about deformation properties by anatomical structure (e.g., by organ) and/or by patient. For example, a priori data about the lung may include a preferred direction of movement, or relative difference expected between vertical movement and horizontal movement of the lung, etc. These a priori data may be used in determining spatially dependent flexibility values.

FIG. 4 illustrates various embodiments of Internal Force Computation Engine 220. Internal Force Computation Engine 220 comprises Flexibility Value Computation Engine 410 and Accumulator Computation Engine 420.

Flexibility Value Computation Engine 410 is configured for computing the set of flexibility values associated with the flexibility model. The computed set of flexibility values is typically stored in Flexibility Values Memory 330 and is optionally spatially dependent. The set of flexibility values can be determined in various ways. In some embodiments, the set of flexibility values is experimentally determined. For example, the set of flexibility values is determined for each person and/or for each different organ by simulation. In another embodiment, the set of flexibility values is determined by matching a large population of images from multiple individuals to identify typical variations between and locations of organs. In some embodiments, boundaries between organs or other areas of interest in a body are given greater flexibility than areas internal to the organs or areas of interest. In some embodiments, a direction specific set of flexibility values is determined by quality of match. In yet other embodiments, the set of flexibility values is responsive to magnitudes of internal and external forces. For example, although internal and external forces are at equilibrium, both forces may be high or both forces may be low. When the magnitudes of forces are consistently found to be high in a specific region, greater flexibility values may be used. In still other embodiments, the set of flexibility values is determined based on the detail available about, for example, an organ. The set of flexibility values may be increased or decreased in response to the amount of detail available about the organ.

There may be multiple factors affecting the determination of the set of flexibility values, including the selection of initial sets of flexibility values and limits. One factor includes whether the set of flexibility values applies between organs (i.e., inter-organ) or within an organ (i.e., intra-organ). Typically, inter-organ flexibility is greater than intra-organ flexibility. Another factor includes the amount of fat in a particular individual patient. The fat variation between individuals (e.g., patients) is typically high and requires that the set of flexibility values be higher when matching inter-patient images. Yet another factor affecting the determination of the set of flexibility values includes the position of bones (e.g., mobility and location of bones), which can vary significantly between individuals. There is typically great variation in movement of organs and thus optimum flexibility values near bones.

Accumulator Computation Engine 420 is configured for computing the set of accumulators to be stored in Accumulators Memory 350. The set of accumulators allows for the deformation of the deformable image to decay in a smooth manner, for example, to avoid large deformations. The set of accumulators may be spatially dependent. For example, in embodiments that include the exponential smoothing model, the set of accumulators can be used to change the smoothing as a function of position and/or direction. Use of the exponential function allows for spatially dependent smoothing. In contrast, the Gaussian smoothing model used in the second phase of the demons algorithm in the prior art is typically performed using a constant Gaussian function for an entire image. In addition, the set of accumulators allows for (e.g., enables) the exponential smoothing model to be performed incrementally pixel-by-pixel in one direction, causing exponential decay. The exponential decay is controlled by one or more exponential decay parameters within an exponential function of the exponential smoothing model. These parameters may be spatially dependent and are configured to determine the degree to which surrounding pixels are included in the smoothing as a function of their distance. Unlike a Gaussian smoothing model, the exponential smoothing model can include abrupt changes in the exponential decay as a function of position and/or direction. This facilitates the deformation of images near abrupt changes in an anatomical structure, for example, at the boundaries between organs.

Figure 5:
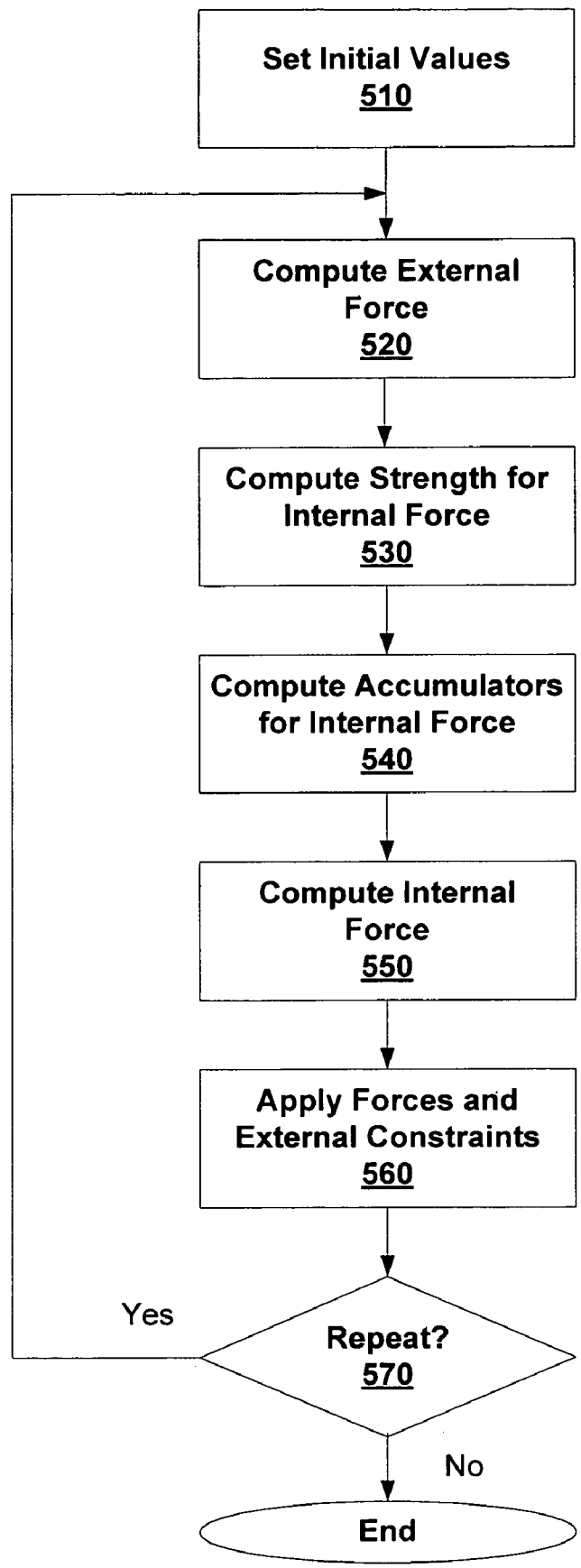
FIG. 5 illustrates methods of deforming an image, according to various embodiments.

FIG. 5 illustrates methods of deforming an image, according to various embodiments. In some embodiments, the methods are performed on all pixels in a reference image and/or the deformable image. In other embodiments, the methods are performed on a set of pixels of interest in the reference image and/or the deformable image, for example, on a pre-computed set of pixels of interest. The method includes iterative application of the internal and external forces such that the deformable image is gradually and smoothly modified to align with the reference image.

In an optional Set Initial Values Step 510, initial values (e.g., sets of flexibility values and limits) are determined, for example, using a priori data on deformation properties stored in A Priori Properties Memory 360. The initial values may differ depending on anatomical structures (e.g., organs) of interest and/or on characteristics of an individual (e.g., patient). A set of initial flexibility limits may be imposed between neighboring pixels. For example, larger deformations typically occur in the region between two anatomical structures (e.g., a wall of the lungs and a surrounding chest cavity) than within the structure (e.g., within the air of the lungs, within the blood of arteries, or within bone and/or brain matter). In some embodiments, the initial values are stored in Flexibility Values Memory 330. In other embodiments, part or all of the initial values are input to Image Registration System 100 via an interface of Computing System 110. For example, initial values may be received via a user interface or based on values stored in memory included in Computing System 110.

In a Compute External Force Step 520, the external transform is computed by minimizing a distance measure of the reference image to the corresponding anatomical feature in the deformable image. For example, a key anatomical feature such as the cortical surface or a lateral ventricle is matched between the images. In some embodiments, Compute External Force Step 520 is performed in manners similar to that of the demons algorithm and/or an extension thereto; however, spatially variant parameters are optionally used. The computation is typically performed by software and/or firmware. In some embodiments, the software and/or firmware is stored in Deformation Engine 120. In other embodiments, part or all of the software and/or firmware is stored in Computing System 110.

In a Compute Strength for Internal Force Step 530, the displacement vector for each pixel of interest is computed. The computation is performed by Internal Force Computation Engine 220. The displacement vectors form an internal force field aimed at bringing the deformable image closer to the reference image. The displacement vector represents the internal force. The internal force comprises a strength as well as a direction (e.g., push for expansion or pull for contraction). Collectively, the displacement vectors generate the internal force field between the deformable image and the reference image.

A displacement value is the strength, e.g., magnitude, of the internal force. The displacement value is represented mathematically as f(i), $0 \leq i < s$, where i is an integer and s equals the size of the grid of pixels.

Compute Strength for Internal Force Step 530 further comprises computing the set of flexibility values. The computation is performed by Flexibility Value Computation Engine 410. In some embodiments, the set of flexibility values is stored in Flexibility Values Memory 330. In other embodiments, part or all of the set of flexibility values is stored in Computing System 110. The set of flexibility values represents the flexibility of a binding between neighboring pixels of the flexibility model. The set of flexibility values is optionally spatially variant, i.e., may depend on position and/or direction. Examples of factors affecting the determination of the set of flexibility values are described, for example, in connection with Flexibility Values Memory 330.

The flexibility value is optionally represented mathematically as u. A complexity of the flexibility model can be increased starting with its simplest form, in which u is a constant value. Next, u can be made spatially variant with respect to the position of the pixel value i. Thus, u=u(i), in one dimension.

The flexibility value u can be extended to become multi-dimensional. There are several ways to extend u to multiple dimensions. In one extension, the coordinates are assumed to be separate. For example, for a three-dimensional model, the coordinates can be separated into an x, y and z-axis. A two-way convolution is applied along each of the coordinate axes separately. This convolution is not circularly symmetric. However, in practice, this asymmetry does not substantially affect results. In a further approach the flexibility model is extended to multiple dimensions by performing a convolution operation along multiple discrete axes and thereafter summing the results.

The multi-dimensional model can be made bi-directional in one or more dimensions. For example, the three-dimensional model can be made bi-directional in terms of a forward and a backward direction for each coordinate axis x, y, and z. A bi-directional convolution is performed by applying the convolution in the reverse direction of the f'(i) series to obtain f''(i). Convolution, f'(i), and f''(i) are described in further detail in connection with Compute Accumulators for Internal Force Step 540 below. For each coordinate axis x, y, and z, a forward and a backward convolution is performed. In total, for the bi-directional three-dimensional model, six convolutions are performed.

The flexibility model can further be made spatially variant with respect to the direction of stretching. In some embodiments, this is accomplished by using a multi-dimensional k×k matrix M instead of scaling a vector f by one or more constant scalars. The displacement vector f is transformed by the matrix M. In one embodiment, M is defined by starting from matrix V and vector u. V is a mapping from a basis of k unit vectors, $v_i$, into basis E, where $E_i=1$ when i=j, 0 otherwise. For each of the directions $v_i$, a length $u_i$ is defined. The matrix M can then be computed as $V^{-1}$ diag(u) V. This matrix has a property that each vector $v_i$ preserves its direction upon mapping by M; however, its length is adjusted. For example, for a three-dimensional model, k equals 3. The three-dimensional spatially variant model allows for the flexibility to vary, for example, perpendicular to a surface such as the lung.

In a Compute Accumulators for Internal Force Step 540, the set of accumulators is computed using Accumulator Computation Engine 420. The calculated set of accumulators is typically stored in Accumulators Memory 350. In some embodiments, the accumulator is represented mathematically as $a_i$, where $a_i=a_{i-1}(1-\exp(-u))+f(i)$. The derivative becomes $f'(i)=a_i\exp(-u)$. The initial value is typically set to zero, i.e., $a_0=0$. The foregoing mathematical formulas can be shown to be equivalent to a discrete convolution of f(i) with exp(-ui), where exp(-ui) is an exponential kernel. An advantage of the exponential kernel representation is that only the previous accumulator $a_{i-1}$ needs to be stored during the convolution operation. In some embodiments, the mathematical representation of the set of accumulators includes the k×k matrix M, as described in connection with Compute Strength for Internal Force Step 530.

In a Compute Internal Force Step 550, the smoothing model is computed. The smoothing model can comprise the Gaussian model typically used in the demons algorithm, the exponential kernel model as described in connection with Compute Accumulators for Internal Force Step 540, or the like. In some embodiments that include the Gaussian smoothing model, the same Gaussian function is used in each iteration of the method (e.g., the value of the standard deviation remains constant between iterations of computations of the Gaussian smoothing function). In some embodiments, a different Gaussian smoothing model is used in different iterations. For example, the value of the standard deviation may vary between iterations.

In some embodiments, the deformation algorithm comprises a constant scalar smoothing model. In these embodiments, Compute Accumulators for Internal Force Step 540 and Compute Internal Force Step 550 are optional.

In some embodiments, Compute Strength for Internal Force Step 530, Compute Accumulators for Internal Force Step 540, and Compute Internal Force Step 550 can be performed in different order or in parallel. For example, in some embodiments, Compute Accumulators for Internal Force Step 540 can be performed prior to or in parallel with Compute Strength for Internal Force Step 530.

In some embodiments, Compute External Force Step 520 can be performed subsequent to or at the same time as (e.g., in parallel with) one or more of Compute Strength for Internal Force Step 530, Compute Accumulators for Internal Force Step 540, and Compute Internal Force 550.

In an Apply Forces and External Constraints Step 560, similar features (e.g., anatomical structures) in the reference image and the deformable image are matched. The matching is performed by applying the external force and the internal force to the deformable image, subject to the external constraints computed by External Force Computation Engine 210. In some embodiments, external constraints are computed in Apply Forces and External Constraints Step 560, for example, when external constraints tend to vary between iterations of the method illustrated by FIG. 5. In some embodiments, external constraints are constant between iterations and are computed in Set Initial Values Step 510. The computations are typically performed by software and/or firmware. In some embodiments, the software and/or firmware is stored in Deformation Engine 120. In other embodiments, part or all of the software and/or firmware is stored in Computing System 110.

In a Repeat Step 570, a determination is made as to whether to repeat the method from Compute External Force Step 520.

In some embodiments, the method is repeated until equilibrium is reached between the internal and external force. At equilibrium, subsequent iterations do not significantly improve the image match. For example, in some embodiments, a determination can be made not to repeat the method when Compute Strength for Internal Force Step 530 results in displacement values below a predetermined value. In other embodiments, a determination is made not to repeat the method after a predetermined number of iterations has been completed.

If, in Repeat Step 570, a determination is made not to repeat the method from Compute External Force Step 520, the user of Image Registration System 100 (e.g., a treating physician) can quantify the anatomical structure (e.g., compute a volume of gray matter and/or white matter of the brain). Such quantization has various pathological uses, including determining future treatment options. The reference image taken for planning purposes at the outset of the treatment may then be compared with the deformable image at equilibrium to identify movement and/or changes in the patient over time. Following the deformation process illustrated by FIG. 5, the deformed deformable image may be used to identify the location of a treatment volume or sensitive organs in order to avoid injuring the patient with, for example, radiation beams in the spinal cord.

Several embodiments are specifically illustrated and/or described herein. However, it will be appreciated that modifications and variations are covered by the above teachings and within the scope of the appended claims without departing from the spirit and intended scope thereof. For example, the systems and methods described herein are equally applicable to image registration in applications other than the medical field. Thus, as used herein, terms such as anatomical structure may be read to include structures other than human biological organs. In various embodiments, some or all of the logic disclosed herein is stored in the form of computing instructions on a computer readable medium. In some embodiments, Deformation Engine 120 and/or Repository 130 are comprised within Computing System 110. In some embodiments, part or all of one or more steps illustrated by FIG. 5 may be computed by a logic component of Deformation Engine 120 other than the logic component illustrated in FIGS. 2, 3, and 4. For example, in some embodiments, the internal and external forces may be computed by the same logic, for example, by Internal Force Computation Engine 220. Logic components described herein may include hardware, firmware or software embodied on a computer readable medium. While the examples discussed herein are presented in the context of a pixel-based image system, it will be apparent to one of ordinary skill in the art that some embodiments are readily adapted to model-based image systems such as those described in www.sci.utah.edu/research/warping.html. The systems and methods discussed herein may be applied to two or three-dimensional images.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An image registration system comprising:
a deformation engine comprising:
   first logic configured to compute a flexibility model comprising a first set of spatially variant constraints or spatially variant scalars and to apply the computed flexibility model to a medical deformable image to generate a set of displacement vectors, the set of displacement vectors being configured to apply a first force to the medical deformable image;
   second logic configured to compute a non-Gaussian smoothing function and to apply the computed non-Gaussian smoothing function to the set of displacement vectors to create a smoothed set of displacement vectors;
   third logic configured to compute a transform, the transform being configured to apply a second force to the medical deformable image, the second force opposing the first force; and
   fourth logic configured to apply the smoothed set of displacement vectors and the transform to the medical deformable image to deform the medical deformable image to match a reference image.

2. The image registration system of claim 1, wherein the non-Gaussian smoothing function is spatially variant.

3. The image registration system of claim 1, further comprising an image generation apparatus configured to produce the medical deformable image.

4. The image registration system of claim 1, wherein the first set of spatially variant constraints or spatially variant scalars includes a first subset of constraints associated with a first direction of displacement between the reference image and the medical deformable image, and a second subset of constraints associated with a second direction of the displacement between the reference image and the medical deformable image.

5. The image registration system of claim 1, wherein the first set of spatially variant constraints or spatially variant scalars includes a plurality of constraints each associated with a different direction of displacement between the reference image and the medical deformable image.

6. The image registration system of claim 1, wherein the non-Gaussian smoothing function is an exponential function.

7. The image registration system of claim 1, wherein the exponential function includes a set of spatially variant decay parameters.

8. The image registration system of claim 1, wherein the non-Gaussian smoothing function is configured to be applied using a multidimensional matrix.

9. An image registration system comprising:
a deformation engine comprising:
   first logic configured to compute a flexibility model comprising a set of spatially variant constraints or spatially variant scalars and to apply the computed flexibility model to a medical deformable image to generate a set of displacement vectors, the set of displacement vectors being configured to apply a first force to the medical deformable image;
   second logic configured to compute a Gaussian smoothing function and to apply the computed Gaussian smoothing function to the set of displacement vectors to create a smoothed set of displacement vectors;
   third logic configured to compute a transform, the transform being configured to apply a second force to the medical deformable image, the second force opposing the first force; and fourth logic configured to apply the smoothed set of displacement vectors and the transform to the medical deformable image to deform the medical deformable image to match a reference image.

10. The image registration system of claim 9, wherein the set of spatially variant constraints includes a first subset of constraints associated with one direction and a second subset of constraints associated with a second direction.

11. An image registration system comprising:
a deformation engine comprising:
first logic configured to compute a flexibility model and to apply the computed flexibility model to a medical deformable image to generate a set of displacement vectors, the set of displacement vectors being configured to apply a first force to the medical deformable image;
second logic configured to compute a spatially variant smoothing function and to apply the computed spatially variant smoothing function to the set of displacement vectors to create a smoothed set of displacement vectors;
third logic configured to compute a transform, the transform being configured to apply a second force to the medical deformable image, the second force opposing the first force; and
fourth logic configured to apply the set of displacement vectors and the transform to the medical deformable image to deforming the medical deformable image to match a reference image.

12. The image registration system of claim 11, wherein the spatially variant smoothing function includes an exponential function.

13. The image registration system of claim 12, wherein the exponential function is dependent on a set of directionally dependent decay parameters.

14. The image registration system of claim 12, wherein the spatially variant smoothing function is configured to be applied using a multi-dimensional matrix.

15. A method comprising:
computing a set of displacement vectors according to a flexibility model comprising a first set of spatially variant constraints or spatially variant scalars, the set of displacement vectors being configured to apply a first force to a medical deformable image;
applying a non-Gaussian smoothing function to the set of displacement vectors to create a smoothed set of displacement vectors;
computing a transform configured to apply a second force to the medical deformable image, the second force opposing the first force; and
applying the transform and the smoothed set of displacement vectors to the medical deformable image to match the medical deformable image to a reference image.

16. The method of claim 15, wherein the non-Gaussian smoothing function is spatially variant.

17. The method of claim 15, wherein the first set of spatially variant constraints or spatially variant scalars includes a first subset of constraints or scalars associated with a first direction of displacement between the reference image and the medical deformable image, and a second subset of constraints or scalars associated with a second direction of the displacement between the reference image and the medical deformable image.

18. The method of claim 15, wherein the first set of spatially variant constraints or spatially variant scalars includes a plurality of constraints or scalars each associated with a different direction of displacement between the reference image and the medical deformable image.

19. The method of claim 15, wherein the non-Gaussian smoothing function includes an exponential function.

20. The method of claim 19, wherein the exponential function includes a set of spatially variant decay parameters.

21. The method of claim 15, wherein the computing of the non-Gaussian smoothing function includes using a multidimensional matrix.

22. The method of claim 15, wherein the first set of spatially variant constraints or spatially variant scalars includes a plurality of spatially variant multi-dimensional constraints.

23. A method comprising:
computing a set of displacement vectors according to a flexibility model comprising a set of spatially variant constraints or spatially variant scalars, the set of displacement vectors being configured to apply a first force to a medical deformable image;
applying a Gaussian smoothing function to the set of displacement vectors to create a smoothed set of displacement vectors;
computing a transform configured to apply a second force to the medical deformable image, the second force opposing the first force; and
applying the computed transform and the smoothed set of displacement vectors to the medical deformable image to match the medical deformable image to a reference image.

24. The method of claim 23, wherein the set of spatially variant constraints includes a first subset of constraints associated with one direction and a second subset of constraints associated with a second direction.

25. A method comprising:
computing a set of displacement vectors according to a flexibility model and applying the set of displacement vectors to a medical deformable image, the set of displacement vectors being configured to apply a first force to the medical deformable image;
applying a spatially variant smoothing function to the medical deformable image;
computing a transform configured to apply a second force to the medical deformable image, the second force opposing the first force; and
applying the transform to the medical deformable image to match the medical deformable image to a reference image.

26. The method of claim 25, wherein the spatially variant smoothing function includes an exponential function.

27. The method of claim 25, wherein the spatially variant smoothing function is applied using a multi-dimensional matrix.

* * * * *